United States Patent
Mori

(10) Patent No.: US 12,371,794 B2
(45) Date of Patent: Jul. 29, 2025

(54) COATED TOOL AND CUTTING TOOL

(71) Applicant: KYOCERA CORPORATION, Kyoto (JP)

(72) Inventor: Satoshi Mori, Satsumasendai (JP)

(73) Assignee: KYOCERA CORPORATION, Kyoto (JP)

(*) Notice: Subject to any disclaimer, the term of this patent is extended or adjusted under 35 U.S.C. 154(b) by 452 days.

(21) Appl. No.: 17/907,269

(22) PCT Filed: Mar. 25, 2021

(86) PCT No.: PCT/JP2021/012687
§ 371 (c)(1),
(2) Date: Sep. 25, 2022

(87) PCT Pub. No.: WO2021/193859
PCT Pub. Date: Sep. 30, 2021

(65) Prior Publication Data
US 2023/0109727 A1    Apr. 13, 2023

(30) Foreign Application Priority Data
Mar. 27, 2020  (JP) .................................. 2020-058285

(51) Int. Cl.
C23C 28/04    (2006.01)
C23C 28/00    (2006.01)

(52) U.S. Cl.
CPC ............ *C23C 28/044* (2013.01); *C23C 28/42* (2013.01); *B23B 2228/105* (2013.01)

(58) Field of Classification Search
None
See application file for complete search history.

(56) References Cited

U.S. PATENT DOCUMENTS

| | | |
|---|---|---|
| 5,296,016 A | 3/1994 | Yoshimura et al. |
| 5,783,295 A | 7/1998 | Barnett et al. |
| 6,821,624 B2 | 11/2004 | Utsumi et al. |
| 2007/0184272 A1 | 8/2007 | Moriguchi |
| 2007/0254173 A1 | 11/2007 | Wallgram et al. |
| 2010/0247885 A1 | 9/2010 | Ito et al. |

(Continued)

FOREIGN PATENT DOCUMENTS

| | | | |
|---|---|---|---|
| JP | S5672105 | * | 6/1981 |
| JP | S5672105 A | | 6/1981 |
| JP | 2006152321 | * | 6/2006 |

(Continued)

OTHER PUBLICATIONS

Machine Translation of JP2006152321 (Year: 2006).*
Machine Translation of JPS5672105 (Year: 1981).*

*Primary Examiner* — Shawn Mckinnon
(74) *Attorney, Agent, or Firm* — HAUPTMAN HAM, LLP

(57) ABSTRACT

A coated tool according to the present disclosure comprises a base body and a coating film. The base body contains a plurality of boron nitride particles. The coating film is located on the base body. In addition, in a case where a hardness is measured by pressing an indenter from a surface of the coating film to a depth of 20% of the coating film while changing an indentation load of the indenter, a maximum hardness difference, which is a difference between a maximum hardness and a minimum hardness of the hardness, is 4 GPa or more.

12 Claims, 10 Drawing Sheets

(56) References Cited

U.S. PATENT DOCUMENTS

2016/0082518 A1  3/2016  Sakai
2023/0173587 A1  6/2023  Mori

FOREIGN PATENT DOCUMENTS

| JP | 2006152321 A | 6/2006 |
|----|--------------|--------|
| JP | 5160231 B2 | 3/2013 |
| WO | 2019189775 A1 | 10/2019 |

* cited by examiner

| SAMPLE | BASE BODY | METAL LAYER | | COATING FILM |||||||
| --- | --- | --- | --- | --- | --- | --- | --- | --- | --- | --- |
| | | | | HARD LAYER |||||||
| | | | | FIRST METAL NITRIDE LAYER || SECOND METAL NITRIDE LAYER || FIRST METAL NITRIDE LAYER + SECOND METAL NITRIDE LAYER | THIRD METAL NITRIDE LAYER ||
| | | TYPE | THICKNESS (µm) | TYPE | THICKNESS (nm) | TYPE | THICKNESS (nm) | THICKNESS (µm) | TYPE | THICKNESS (µm) |
| cBN WITHOUT METAL LAYER | cBN | - | - | TiAlNbWSiN | 50 | AlCrN | 50 | 0.5 | TiAlNbWSiN | 2 |
| cBN WITH METAL LAYER | cBN | Al₇₀Cr₃₀ | 0.2 | | | | | | | |

FIG. 6

| SAMPLE | MAXIMUM HARDNESS (GPa) | MAXIMUM HARDNESS LOAD (mN) | MAXIMUM HARDNESS DEPTH (nm) | MINIMUM HARDNESS (GPa) | MINIMUM HARDNESS LOAD (mN) | MINIMUM HARDNESS DEPTH (nm) | MAXIMUM HARDNESS DIFFERENCE (GPa) | AVERAGE HARDNESS (GPa) | DIFFERENCE BETWEEN AVERAGE HARDNESS AND MAXIMUM HARDNESS (GPa) | DIFFERENCE BETWEEN AVERAGE HARDNESS AND MINIMUM HARDNESS (GPa) |
|---|---|---|---|---|---|---|---|---|---|---|
| cBN WITHOUT METAL LAYER | 23 | 70 | 434.2 | 19.6 | 85 | 513.6 | 3.4 | 20.9 | 2.1 | 1.3 |
| cBN WITH METAL LAYER | 27.8 | 35 | 274.6 | 18.1 | 90 | 547.8 | 9.7 | 21.6 | 6.2 | 3.5 |

FIG. 7

| SAMPLE | PEEL LOAD (N) | PEEL TIME (min) |
|---|---|---|
| cBN WITHOUT METAL LAYER | 30 | 1 |
| cBN WITH METAL LAYER | 80> | 40> |

FIG. 10

COATED TOOL AND CUTTING TOOL

CROSS-REFERENCE TO RELATED APPLICATIONS

This application is national stage application of International Application No. PCT/JP2021/012687, filed on Mar. 25, 2021, which designates the United States, incorporated herein by reference, and which claims the benefit of priority from Japanese Patent Application No. 2020-058285, filed on Mar. 27, 2020.

TECHNICAL FIELD

The present disclosure relates to a coated tool and a cutting tool.

BACKGROUND ART

As a tool used for cutting processing such as turning processing or milling processing, a coated tool is known in which a surface of a base body such as cemented carbide, cermet, or ceramic is coated with a coating film to improve wear resistance, etc. (see Patent Document 1).

CITATION LIST

Patent Literature

Patent Document 1: JP 5160231

SUMMARY OF INVENTION

According to an aspect of the present disclosure, a coated tool includes a base body and a coating film. The base body contains a plurality of boron nitride particles. The coating film is located on the base body. In addition, in a case where a hardness is measured by pressing an indenter from a surface of the coating film to a depth of 20% of the coating film while changing an indentation load of the indenter, a maximum hardness difference, which is a difference between a maximum hardness and a minimum hardness of the hardness, is 4 GPa or more.

BRIEF DESCRIPTION OF DRAWINGS

FIG. 6 is a table showing a configuration of each sample.

FIG. 7 is a table showing results of an indentation hardness test on cBN without a metal layer and cBN with a metal layer.

FIG. 10 is a table showing results of a scratch test and a peel test on cBN without a metal layer and cBN with a metal layer.

DESCRIPTION OF EMBODIMENTS

The following is a detailed description of a coated tool and a cutting tool according to the present disclosure (hereinafter referred to as "embodiments") with reference to the drawings. It should be noted that the coated tool and the cutting tool according to the present disclosure are not limited by the embodiments. In addition, embodiments can be appropriately combined so as not to contradict each other in terms of processing content. In the following embodiments, the same portions are denoted by the same reference signs, and overlapping explanations are omitted.

In the embodiments described below, expressions such as "constant", "orthogonal", "vertical", and "parallel" may be used, but these expressions do not need to be exactly "constant", "orthogonal", "vertical", and "parallel". In other words, each of the above-described expressions allows for deviations in, for example, manufacturing accuracy, positioning accuracy, and the like.

In the related art described above, there is room for further improvement in terms of improving the adhesion between the coating film and the base body.

The present disclosure has been made in light of the foregoing, and provides a coated tool and a cutting tool capable of improving the adhesion between the coating film and the base body.

Coated Tool

Figure 1:
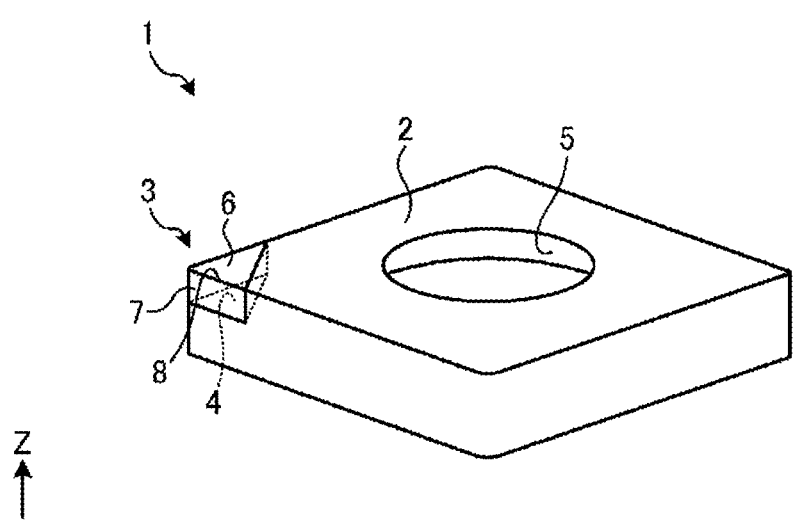
FIG. 1 is a perspective view illustrating an example of a coated tool according to an embodiment.

FIG. 1 is a perspective view illustrating an example of a coated tool according to an embodiment. As illustrated in FIG. 1, a coated tool 1 according to the embodiment includes a tip body 2 and a cutting edge portion 3. In the embodiment, the coated tool 1 has a hexagonal shape in which a shape of an upper surface and a lower surface (a surface intersecting the Z-axis illustrated in FIG. 1) is a parallelogram.

Tip Body 2

The tip body 2 is formed of, for example, cemented carbide. The cemented carbide contains tungsten (W), specifically, tungsten carbide (WC). Further, the cemented carbide may contain nickel (Ni) or cobalt (Co). The tip body 2 may be formed of a cermet. The cermet contains, for example, titanium (Ti), specifically, titanium carbide (TiC) or titanium nitride (TiN). Furthermore, the cermet may contain Ni or Co.

A seat 4 for attaching the cutting edge portion 3 is located in a corner portion of the tip body 2. In addition, a through hole 5 that vertically penetrates the tip body 2 is located in the center portion of the tip body 2. A screw 75 for attaching the coated tool 1 to a holder 70 described later is inserted into the through hole 5 (see FIG. 5).

Cutting Edge Portion 3

The cutting edge portion 3 is integrated with the tip body 2 by being attached to the seat 4 of the tip body 2.

The cutting edge portion 3 has a first surface 6 (here, an upper surface) and a second surface 7 (here, a side surface) that is connected to the first surface 6. In the embodiment, the first surface 6 functions as a "rake face" for scooping chips generated by cutting, and the second surface 7 functions as a "flank face". A cutting edge 8 is located on at least a part of a ridge line where the first surface 6 and the second surface 7 intersect with each other, and the coated tool 1 cuts a work material through application of the cutting edge 8 against the work material.

Figure 2:
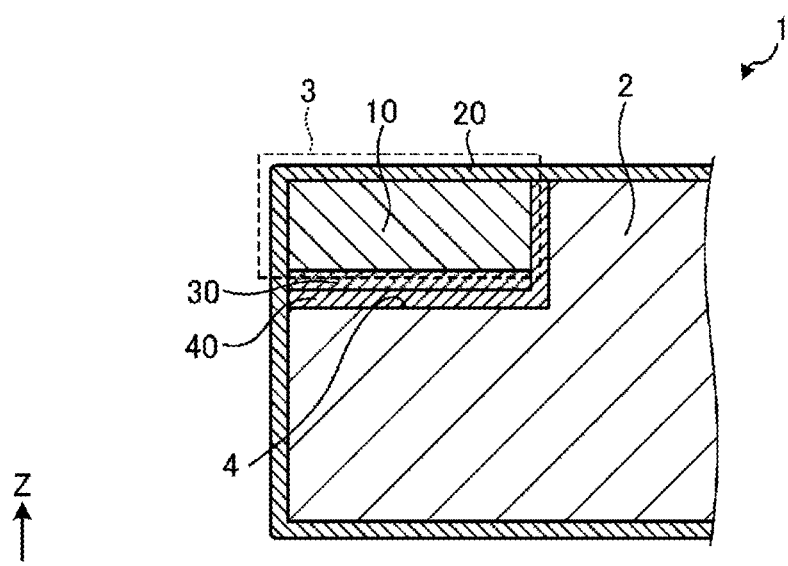
FIG. 2 is a side sectional view illustrating an example of the coated tool according to the embodiment.

The configuration of the cutting edge portion 3 will be described with reference to FIG. 2. FIG. 2 is a side sectional view illustrating an example of the coated tool according to the embodiment. As illustrated in FIG. 2, the cutting edge portion 3 has a base body 10 and a coating film 20.

Base Body 10

The base body 10 contains a plurality of boron nitride particles. In the embodiment, the base body 10 is a cubic boron nitride (cBN) sintered compact and contains a plurality of cubic boron nitride particles. In the embodiment, the base body 10 may have a binder phase containing TiN, Al, $Al_2O_3$, etc. between the plurality of boron nitride particles. The plurality of boron nitride particles are strongly bonded by such a binder phase. Note that the base body 10 does not necessarily have a binder phase.

A substrate 30 made from, for example, cemented carbide or cermet may be located on the lower surface of the base body 10. In this case, the base body 10 is bonded to the seat 4 of the tip body 2 via the substrate 30 and a bonding material 40. The bonding material 40 is, for example, a brazing material. In a portion other than the seat 4 of the tip body 2, the base body 10 may be bonded to the tip body 2 via the bonding material 40.

Coating Film 20

The base body 10 is coated with the coating film 20 for the purpose of, for example, improving wear resistance, heat resistance, etc. of the cutting edge portion 3. In the example in FIG. 2, the coating film 20 entirely covers the tip body 2 and the cutting edge portion 3. The coating film 20 may be located at least on the base body 10. When the coating film 20 is located on the upper surface of the base body 10 corresponding to the first surface 6 of the cutting edge portion 3, the wear resistance and heat resistance of the first surface 6 are high. When the coating film 20 is located on the side surface of the base body 10 corresponding to the second surface 7 of the cutting edge portion 3, the wear resistance and heat resistance of the second surface 7 are high.

Figure 3:
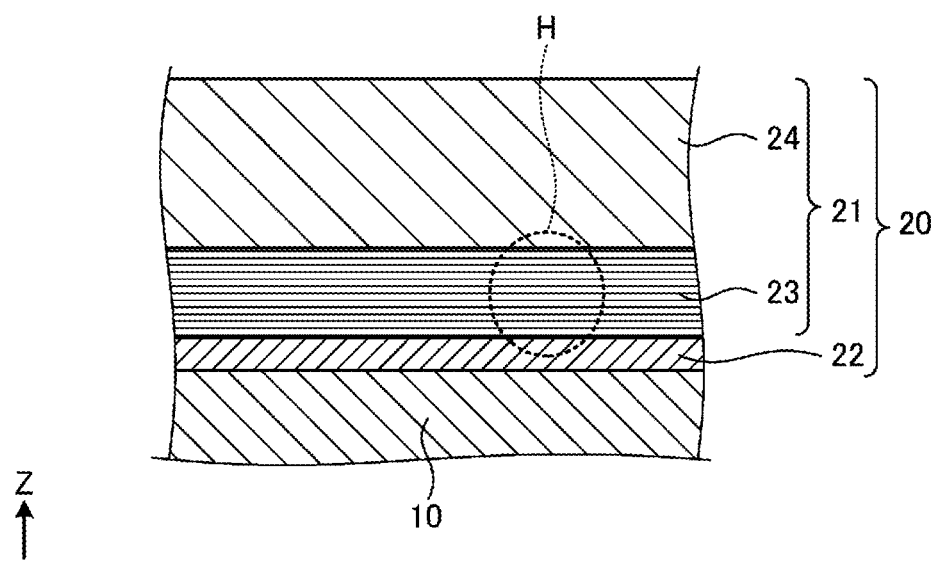
FIG. 3 is a cross-sectional view illustrating an example of the coating film according to the embodiment.

Here, a specific configuration of the coating film 20 will be described with reference to FIG. 3. FIG. 3 is a cross-sectional view illustrating an example of the coating film 20 according to the embodiment.

As illustrated in FIG. 3, the coating film 20 has a hard layer 21. The hard layer 21 is a layer having excellent wear resistance compared with a metal layer 22 described below. The hard layer 21 has one or more metal nitride layers. The hard layer 21 may be one layer. Additionally, as illustrated in FIG. 3, a plurality of metal nitride layers may be overlapped. Additionally, the hard layer 21 may include a laminate portion 23 in which a plurality of metal nitride layers are layered, and a third metal nitride layer 24 located above the laminate portion 23. The configuration of the hard layer 21 will be described later.

Metal Layer 22

Further, the coating film 20 includes the metal layer 22. The metal layer 22 is located between the base body 10 and the hard layer 21. Specifically, the metal layer 22 has one surface (here, a lower surface) in contact with the upper surface of the base body 10 and another surface (here, an upper surface) in contact with the lower surface of the hard layer 21.

The metal layer 22 has a higher adhesion to the base body 10 than to the hard layer 21. Examples of metal elements having such characteristics include Zr, V, Cr, W, Al, Si, and Y. The metal layer 22 contains at least one metal element among the above-described metal elements.

Note that a simple substance of Ti, a simple substance of Zr, a simple substance of V, a simple substance of Cr, and a simple substance of Al are not used as the metal layer 22. These are not suitable for use in cutting tools because all of these materials have a low melting point and low oxidation resistance. In addition, a simple substance of Hf, a simple substance of Nb, a simple substance of Ta, and a simple substance of Mo have low adhesion to the base body 10. However, this does not apply to alloys containing Ti, Zr, V, Cr, Ta, Nb, Hf, and Al.

The metal layer 22 may be an Al—Cr alloy layer containing an Al—Cr alloy. Since the metal layer 22 has particularly high adhesion to the base body 10, the effect of improving the adhesion between the base body 10 and the coating film 20 is high.

When the metal layer 22 is an Al—Cr alloy layer, the Al content in the metal layer 22 may be greater than the content of Cr in the metal layer 22. For example, the composition ratio (atomic %) of Al and Cr in the metal layer 22 may be 70:30. With such a composition ratio, the adhesion between the base body 10 and the metal layer 22 is higher.

The metal layer 22 may contain components other than the metal elements (Zr, V, Cr, W, Al, Si, Y). However, from the perspective of adhesion to the base body 10, the metal layer 22 may contain at least 95 atomic % or more of the metal elements in a combined amount. More preferably, the metal layer 22 may contain 98 atomic % or more of the metal elements in a combined amount. For example, in a case where the metal layer 22 is an Al—Cr alloy layer, the metal layer 22 may contain at least 95 atomic % or more of Al and Cr in a combined amount. Furthermore, the metal layer 22 may contain at least 98 atomic % or more of Al and Cr in a combined amount. Note that the proportion of the metal components in the metal layer 22 can be identified by, for example, analysis using an energy dispersive X-ray spectrometer (EDS).

In addition, since Ti has poor wettability with the base body 10 according to the embodiment, it is preferable that the metal layer 22 does not contain Ti as much as possible from the viewpoint of improving adhesion with the base body 10. Specifically, the Ti content in the metal layer 22 may be 15 atomic % or less.

As described above, in the coated tool 1 according to the embodiment, by providing the metal layer 22 having higher wettability with the base body 10 than the hard layer 21 between the base body 10 and the hard layer 21, it is possible to improve the adhesion between the base body 10 and the coating film 20. Since the metal layer 22 has high adhesion to the hard layer 21, the hard layer 21 is less likely to peel off from the metal layer 22.

Also, the cBN used as the base body 10 is an insulator, and there is room for improvement in adhesion with a film formed by a physical vapor deposition method (PVD). In contrast, in the coated tool 1 according to the embodiment, the metal layer 22 having electrical conductivity is provided on the surface of the base body 10, and thus the adhesion between the hard layer 21 formed by PVD and the metal layer 22 is high.

Hard Layer 21

Figure 4:
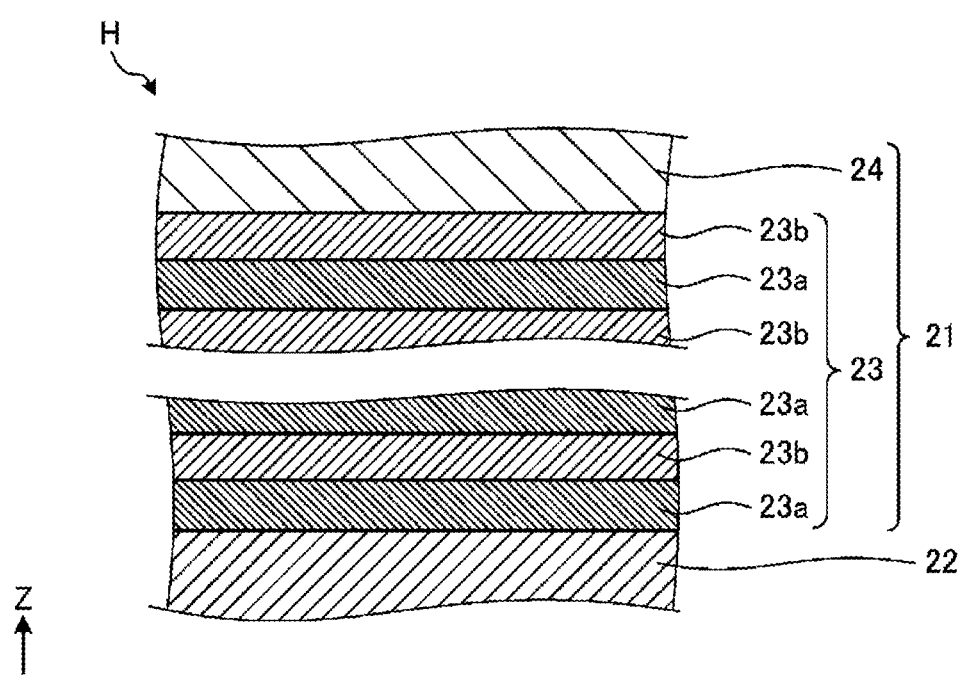
FIG. 4 is a schematic enlarged view of a portion H illustrated in FIG. 3.

Next, the configuration of the hard layer 21 will be described with reference to FIG. 4. FIG. 4 is a schematic enlarged view of a portion H illustrated in FIG. 3.

As illustrated in FIG. 4, the hard layer 21 has the laminate portion 23 located on the metal layer 22 and the third metal nitride layer 24 located on the laminate portion 23.

The laminate portion 23 includes a plurality of first metal nitride layers 23a and a plurality of second metal nitride layers 23b. The laminate portion 23 has a configuration in which the first metal nitride layers 23a and the second metal nitride layers 23b are alternately layered.

The thickness of the first metal nitride layer 23a and the second metal nitride layer 23b may be 50 nm or less, respectively. In this way, by forming the first metal nitride layer 23a and the second metal nitride layer 23b thin, the residual stress of the first metal nitride layer 23a and the second metal nitride layer 23b is small. As a result, for example, peeling and cracking of the first metal nitride layer 23a and the second metal nitride layer 23b are less likely to occur, so that the durability of the coating film 20 is high.

The first metal nitride layer 23a is a layer that contacts the metal layer 22, and the second metal nitride layer 23b is formed on the first metal nitride layer 23a.

The first metal nitride layer 23a and the second metal nitride layer 23b may contain a metal contained in the metal layer 22.

For example, it is assumed that two kinds of metals (here, "first metal" and "second metal") are included in the metal layer 22. In this case, the first metal nitride layer 23a contains a nitride of the first metal and the third metal. The third metal is a metal not included in the metal layer 22. The second metal nitride layer 23b contains a nitride of the first metal and the second metal.

For example, in the embodiment, the metal layer 22 may contain Al and Cr. In this case, the first metal nitride layer 23a may contain Al. Specifically, the first metal nitride layer 23a may be an AlTiN layer containing AlTiN, which is a nitride of Al and Ti. The second metal nitride layer 23b may be an AlCrN layer containing AlCrN, which is a nitride of Al and Cr.

In this way, the first metal nitride layer 23a containing the metal contained in the metal layer 22 is located on the metal layer 22, and thus the adhesion between the metal layer 22 and the hard layer 21 is high. This makes it difficult for the hard layer 21 to peel off from the metal layer 22, so the durability of the coating film 20 is high.

The first metal nitride layer 23a, that is, the AlTiN layer is excellent in terms of, for example, wear resistance in addition to adhesion to the metal layer 22 described above. The second metal nitride layer 23b, that is, the AlCrN layer, has excellent heat resistance and oxidation resistance, for example. In this manner, the coating film 20 includes the first metal nitride layer 23a and the second metal nitride layer 23b having different compositions from each other, and thus properties such as wear resistance and heat resistance of the hard layer 21 can be controlled. Accordingly, the tool life of the coated tool 1 can be extended. For example, in the hard layer 21 according to the embodiment, mechanical properties such as adhesion with the metal layer 22 and wear resistance can be improved while maintaining excellent heat resistance of AlCrN.

Note that the laminate portion 23 may be formed by, for example, an arc ion plating method (AIP method). The AIP method is a method in which target metals (here, an AlTi target and an AlCr target) are evaporated by using an arc discharge in a vacuum atmosphere, and are combined with $N_2$ gas to form metallic nitrides (here, AlTiN and AlCrN). Note that the metal layer 22 may also be formed by the AIP method.

The third metal nitride layer 24 may be located on the laminate portion 23. Specifically, the third metal nitride layer 24 is in contact with the second metal nitride layer 23b of the laminate portion 23. The third metal nitride layer 24 is, for example, a metal nitride layer (AlTiN layer) containing Ti and Al similar to the first metal nitride layer 23a.

The thickness of the third metal nitride layer 24 may be greater than each thickness of the first metal nitride layer 23a and the second metal nitride layer 23b. Specifically, as described above, when the thickness of the first metal nitride layer 23a and the second metal nitride layer 23b is 50 nm or less, the thickness of the third metal nitride layer 24 may be 1 μm or more. For example, the thickness of the third metal nitride layer 24 may be 1.2 μm.

As a result, for example, when the coefficient of friction of the third metal nitride layer 24 is low, the welding resistance of the coated tool 1 can be improved. In addition, for example, when the hardness of the third metal nitride layer 24 is high, the wear resistance of the coated tool 1 can be improved. In addition, for example, when the oxidation start temperature of the third metal nitride layer 24 is high, the oxidation resistance of the coated tool 1 can be improved.

The thickness of the third metal nitride layer 24 may be greater than the thickness of the laminate portion 23. Specifically, in the embodiment, when the thickness of the laminate portion 23 is 0.5 μm or less, the thickness of the third metal nitride layer 24 may be 1 μm or more. For example, when the thickness of the laminate portion 23 is 0.3 μm, the thickness of the third metal nitride layer 24 may be 1.2 μm. In this way, the third metal nitride layer 24 is thicker than the laminate portion 23, and thus the effect of improving the welding resistance, wear resistance, etc. described above is further enhanced.

The thickness of the metal layer 22 may be, for example, 0.1 μm or more and less than 0.6 μm. That is, the metal layer 22 may be thicker than each of the first metal nitride layer 23a and the second metal nitride layer 23b, and may be thinner than the laminate portion 23.

Cutting Tool

Figure 5:
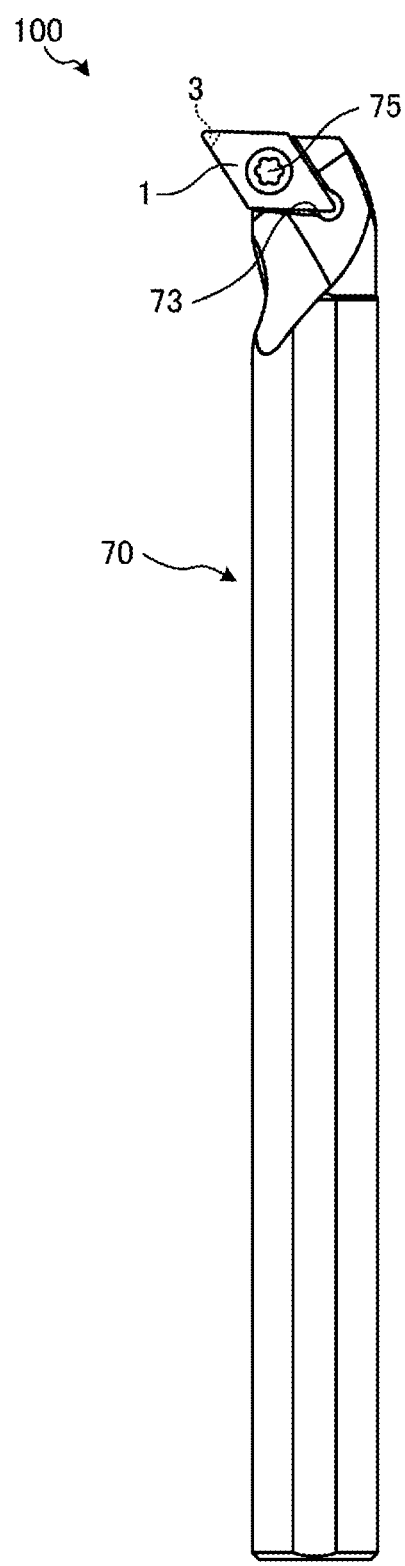
FIG. 5 is a front view illustrating an example of a cutting tool according to the embodiment.

Next, a configuration of a cutting tool including the above-described coated tool 1 will be described with reference to FIG. 5. FIG. 5 is a front view illustrating an example of a cutting tool according to the embodiment.

As illustrated in FIG. 5, the cutting tool 100 according to the embodiment includes the coated tool 1 and a holder 70 for fixing the coated tool 1.

The holder 70 is a rod-shaped member that extends from a first end (an upper end in FIG. 5) toward a second end (a lower end in FIG. 5). The holder 70 is made of, for example, steel or cast iron. In particular, it is preferable to use steel having high toughness among these members.

The holder 70 has a pocket 73 at an end portion on the first end side. The pocket 73 is a portion in which the coated tool 1 is mounted, and has a seating surface intersecting with the rotation direction of the work material and a binding side surface inclined with respect to the seating surface. A screw hole into which a screw 75 described later is screwed is provided on the seating surface.

The coated tool 1 is located in the pocket 73 of the holder 70, and is mounted on the holder 70 by the screw 75. That is, the screw 75 is inserted into the through hole 5 of the coated tool 1, and the tip end of the screw 75 is inserted into the screw hole formed in the seating surface of the pocket 73, and the screw portions are screwed together. Thus, the coated tool 1 is mounted on the holder 70 such that the cutting edge 8 (see FIG. 1) protrudes outward from the holder 70.

In the embodiment, a cutting tool used for so-called turning processing is exemplified. As the turning processing, for example, boring, external turning, and groove-forming are cited. Note that, a cutting tool is not limited to those used in the turning processing. For example, the coated tool 1 may be used as a cutting tool used for milling processing.

For example, the cutting processing of the work material includes the steps of (1) rotating a work material, (2) bringing the cutting edge 8 of the coated tool 1 into contact with the rotating work material to cut the work material, and (3) separating the coated tool 1 from the work material. Here, representative examples of the material of the work material include carbon steel, alloy steel, stainless steel, cast iron, non-ferrous metals, etc.

Example 1: Indentation Hardness Test

The inventors of the present application performed an indentation hardness test on a sample in which a coating film was formed on a base body containing boron nitride particles. The base body is made of a plurality of cubic boron nitride particles and a binder phase containing TiN. The base body contains about 25% by volume of the binder phase.

The samples are of the following two types.
(1) A coating film with a metal layer formed on cBN (hereinafter referred to as "cBN with metal layer")
(2) A coating film without a metal layer formed on cBN (hereinafter referred to as "cBN without metal layer")

Here, a specific configuration of each sample will be described with reference to FIG. 6. FIG. 6 is a table showing a configuration of each sample.

As shown in FIG. 6, cBN with a metal layer has a coating film made of a metal layer and a hard layer on a base body made of cBN. Specifically, the metal layer is located on the base body, and the hard layer is located on the metal layer. On the other hand, cBN without a metal layer has a coating film made of a hard layer on a base body made of cBN.

The metal layer in cBN with a metal layer contains Al and Cr. The specific composition of such a metal layer is $Al_{70}Cr_{30}$. That is, the metal layer contains 70 atomic % of Al and 30 atomic % of Cr. The thickness of the metal layer is 0.2 μm.

The hard layer of cBN with a metal layer and cBN without a metal layer includes the first metal nitride layer, the second metal nitride layer, and the third metal nitride layer. The first metal nitride layer and the second metal nitride layer are alternately layered. In addition, the third metal nitride layer is located on the first metal nitride layer and the second metal nitride layer which are alternately layered.

The ratio of only the metal components of the first metal nitride layer described as TiAlNbWSiN in FIG. 6 is 42 atomic % of Ti, 48 atomic % of Al, 3 atomic % of Nb, 4 atomic % of W, and 3 atomic % of Si. The first metal nitride layer contains about 100 atomic % of N with respect to 100 atomic % of the metal component. The thickness of one first metal nitride layer is 50 nm.

The ratio of only the metal components of the second metal nitride layer described as AlCrN in FIG. 6 is 70 atomic % of Al and 30 atomic % of Cr. The second metal nitride layer contains about 100 atomic % of N with respect to 100 atomic % of the metal components. The thickness of one second metal nitride layer is 50 nm.

The total thickness of the plurality of first metal nitride layers and the plurality of second metal nitride layers is 0.5 μm.

The composition of the third metal nitride layer is the same as the composition of the first metal nitride layer. The thickness of the third metal nitride layer is 2 μm.

Figure 8:
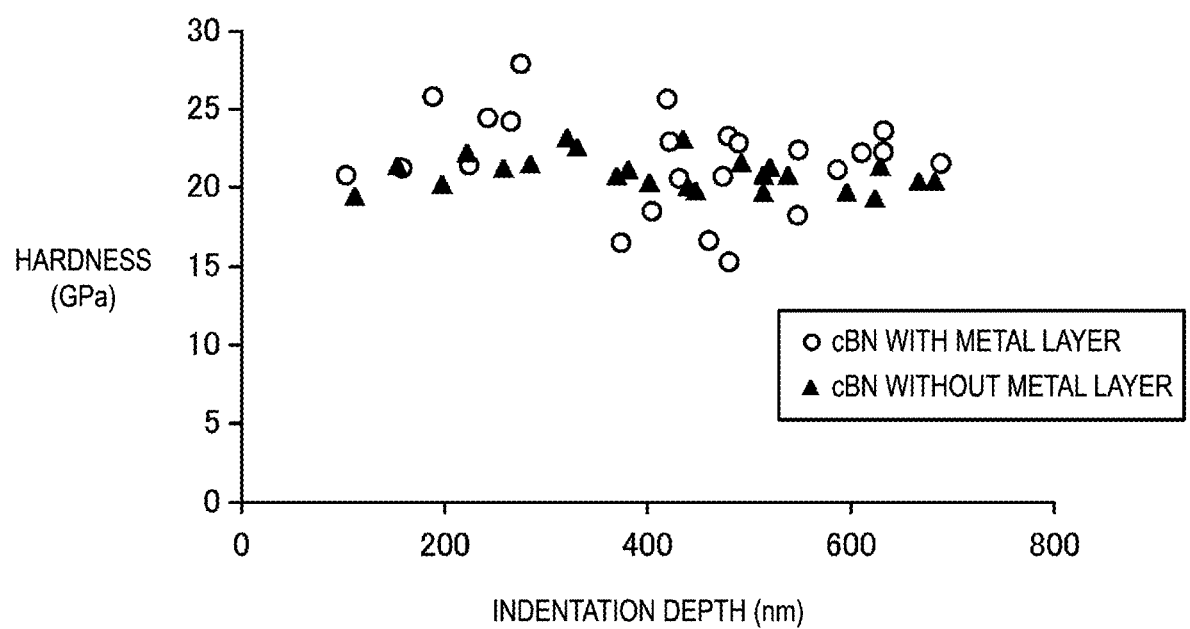
FIG. 8 is a graph showing results of an indentation hardness test on cBN without a metal layer and cBN with a metal layer.

The results of the indentation hardness test on such a sample are shown in FIGS. 7 and 8. FIG. 7 is a table showing results of an indentation hardness test on cBN without a metal layer and cBN with a metal layer, and FIG. 8 is a graph showing the results of the test.

The present test was performed using a microindentation hardness tester "ENT-1100b/a" (manufactured by Elionix Inc.).

Prior to measurement of hardness, the thickness of the coating film was measured in the cross section of the base body orthogonal to the surface of the base body. The coating film had a thickness of 2.7 μm when the metal layer was included. The coating film had a thickness of 2.5 μm when the metal layer was not included. The indenter was pushed in from the surface of the coating film by 20% of the thickness of the coating film. The indentation of the indenter into the surface of the coating film was increased approximately every 0.02 μm. This indentation depth can be made deep by increasing the indentation load. Increasing the indentation depth every 0.02 μm is equivalent to increasing the indentation load about every 5 mN.

In this test, when the indenter is pushed in to a depth of 20% of the thickness of the coating film, the hardness from the surface of the coating film to the vicinity of the surface of the base body can be measured. In the present disclosure, as described above, the hardness of the coating film refers to the hardness obtained by pressing an indenter from the surface of the coating film to a depth of 20% of the coating film while changing the indentation load of the indenter. In the indentation hardness test, with deeper indentation depth, it is possible to measure the hardness of a deeper region from the surface of the coating film.

In FIG. 8, the measurement results of cBN with a metal layer are indicated by white circles, and the measurement results of cBN without a metal layer are indicated by black triangles. As shown in FIG. 8, it can be seen that cBN with a metal layer has a higher hardness on the whole than cBN without a metal layer. This increase in hardness is marked in a region from the indentation depth of 300 nm or less. The hardness in the indentation depth of 300 nm or less indicates the hardness of the hard layer. From this, it can be seen that cBN with a metal layer has a higher hardness in the hard layer than cBN without a metal layer.

Figure 9:
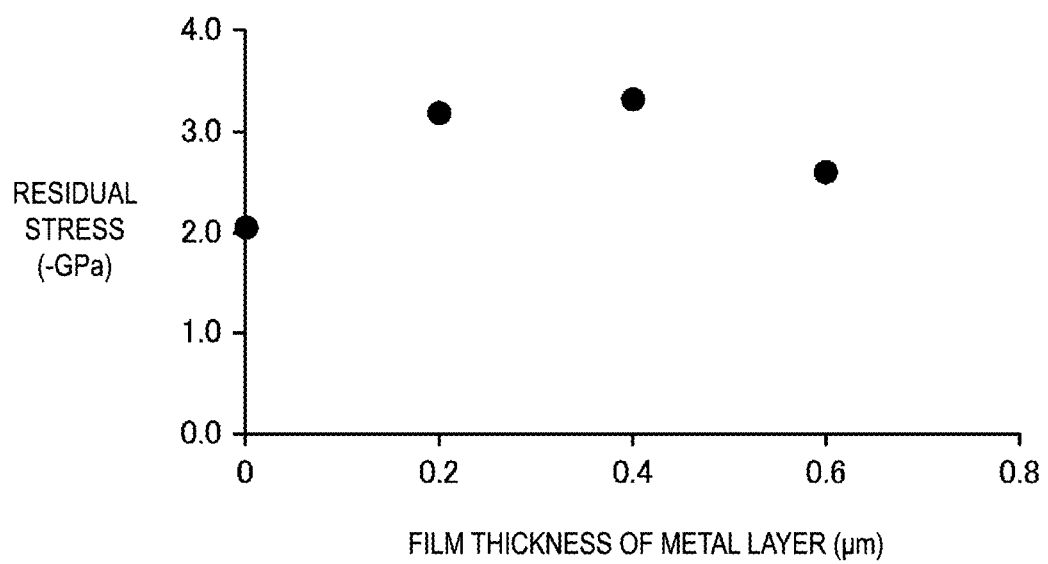
FIG. 9 is a graph showing changes in the residual stress of a coating film when a film thickness of a metal layer is changed.

This point will be described with reference to FIG. 9. FIG. 9 is a graph showing changes in the residual stress of a coating film when a film thickness of a metal layer is changed.

FIG. 9 shows the results of measuring the residual stress of the coating film based on the amount of warpage of the stainless steel plate on which the coating film with a metal layer is formed. In FIG. 9, the results for a film thickness of 0 μm show the residual stress of a coating film having no metal layer, that is, a coating film having only the hard layer. Furthermore, the results for film thicknesses of 0.2 μm, 0.4 μm, and 0.6 μm show the residual stress of a coating film with a metal layer.

As shown in FIG. 9, it can be seen that the coating film with a metal layer has a higher residual stress than the coating film with a metal layer. The higher the residual stress, the higher the hardness of the coating film. Therefore, it can be seen that the hardness of the coating film increases by forming the metal layer.

One reason why the residual stress of the coating film increases due to the metal layer is considered to be as follows. That is, in PVD coating, a bias voltage is applied to an object (such as cBN, cemented carbide) on which a film is to be formed, and by forming a metal layer, more ions are attracted to the object on which the film is to be formed when the bias voltage is applied. As a result, it is thought that a higher residual stress occurred in the coating film with a metal layer than in the coating film without a metal layer.

Note that when the film thickness of the metal layer was 0.6 μm, peeling of the coating film occurred and the residual stress was reduced. From this result, the film thickness of the metal layer is preferably from 0.1 μm to less than 0.6 μm.

Further, as shown in FIG. 8, cBN with a metal layer has a hardness valley in the vicinity of the indentation depth of 300 nm. This is a feature not found in cBN without a metal layer. As described above, the hardness in the vicinity of the indentation depth of 300 nm indicates the hardness of the metal layer. It is thought that such a hardness valley was formed because the metal layer is softer than the hard layer.

In the measurement results shown in FIG. 6, the difference between the maximum hardness and the minimum hardness (hereinafter, referred to as "maximum hardness difference") of cBN without a metal layer is less than 4 GPa, whereas the maximum hardness difference of cBN with a metal layer is 4 GPa or more. Specifically, the maximum hardness difference of cBN with a metal layer is 8 GPa or more.

In this manner, the coated tool having a maximum hardness difference of 4 GPa or more has a high-hardness portion and a low-hardness portion, and the difference therebetween is 4 GPa or more. First, a description will be given of a case where a low-hardness portion is located farther from the base body than a high-hardness portion in such a configuration. For example, in a case where a large impact is repeatedly applied to the coated tool as in intermittent machining, since the low-hardness portion is located at a position closer to the surface of the coated tool than the high-hardness portion, the impact is easily absorbed at the portion and a fracture is less likely to occur.

Next, a case where the high-hardness portion is located farther from the base body than the low-hardness portion will be described. In such a case, it is suitable for continuous processing. That is, since the high-hardness portion is located at a position close to the surface of the coated tool, wear resistance is excellent, and since impact is absorbed by the low-hardness portion, wear resistance and impact resistance are excellent.

cBN with a metal layer has the maximum hardness on the surface layer side of the coating film. Specifically, the indentation depth at the maximum hardness is smaller than the indentation depth at the minimum hardness.

In this manner, cBN with a metal layer has the maximum hardness on the surface layer side. In other words, by providing the metal layer, it is possible to increase the hardness of the coating film on the surface layer side. Therefore, the life of the coated tool can be increased.

Among the results shown in FIG. 7, the "maximum hardness" is the maximum value of the hardness in the measurement range (range from the surface of the coating film to 20% of the depth of the coating film), and the "minimum hardness" is the minimum value of the hardness in the measurement range. The "maximum hardness load" is the indentation load of the indenter at the maximum hardness, and the "maximum hardness depth" is the indentation depth of the indenter at the maximum hardness. The "minimum hardness load" is the indentation load of the indenter at the minimum hardness, and the "minimum hardness depth" is the indentation depth of the indenter at the minimum hardness.

The "maximum hardness difference" is the difference between the maximum hardness and the minimum hardness. The "average hardness" is an average value of hardness in a measurement range.

The maximum hardness depth difference, which is a difference between the maximum hardness depth and the minimum hardness depth in cBN with a metal layer, may be from 180 nm to 500 nm.

A maximum hardness depth difference of 180 nm or more means, in other words, that the change in hardness is relatively gentle, and the properties of coated tools are less likely to change rapidly. In such a case, defects are unlikely to occur. In addition, a maximum hardness depth difference of 500 nm or less means that the position indicating the maximum hardness and the position indicating the minimum hardness are relatively close to each other. This makes the effect more pronounced when the maximum hardness difference is 4 GPa or more.

The maximum hardness depth in cBN with a metal layer is from 80 nm to 200 nm. With such a configuration, wear resistance is excellent.

The minimum hardness depth in cBN with a metal layer is 300 nm or more. With such a configuration, fractures are less likely to occur in the intermittent processing.

When the average value of the hardness of cBN with a metal layer is defined as the average hardness, the difference between the average hardness and the maximum hardness is 3.0 GPa or less. In other words, with such a configuration, the coating film has a relatively high hardness on the whole, which provides excellent wear resistance.

In cBN with a metal layer, the difference between the average hardness and the minimum hardness is 2.0 GPa or more. In other words, with such a configuration, the coating film has a relatively high hardness on the whole, which provides excellent wear resistance.

The maximum hardness is 25 GPa or more. When having such a high hardness, wear resistance is excellent.

Example 2: Scratch Test And Peel Test

Further, the inventors of the present application performed a scratch test and a peel test on each sample of cBN without a metal layer and cBN with a metal layer described above. The scratch test was evaluated by the magnitude of the peel load, and the larger the peel load, the more difficult the peeling. In addition, the longer the peel time, the less likely it is for peeling to occur.

The scratch test was performed using a diamond indenter having a tip shape with a curvature radius R of 200 μm at a rate of 10 mm/min and a load rate of 100 N per minute.

The peel test was performed on a hardened SCM415 work piece using a tool-shaped sample of CNGA120408S01225 under the processing conditions of cutting rate: 150 m/min, feed rate: 0.1 mm/rotation, and depth of cut: 0.2 mm, and the time until the hard layer peeled off was evaluated.

The peel load and peel time are shown in FIG. 10. FIG. 10 is a table showing a result of a scratch test and a peel test on cBN without a metal layer and cBN with a metal layer. As shown in FIG. 8, in cBN with a metal layer, the peel load was larger than that of cBN without a metal layer, and the peel time was significantly longer. In FIG. 10, "80>" indicates that the peel load is less than 80 N but close to 80 N (at least 75 N or more). Similarly, in FIG. 10, "40>" indicates that the peel time is less than 40 minutes but close to 40 minutes (at least 35 minutes or more). Thus, in cBN with a metal layer, peeling of the coating film is less likely to occur compared with cBN without a metal layer, that is, the durability of the coating film is high.

Variation

In the above-described embodiment, the coated tool 1 in which the base body 10 made of boron nitride particles, etc.

is attached to the tip body 2 made of cemented carbide, etc. and these are coated with the coating film 20 has been described. Without being limited thereto, the coated tool according to the present disclosure may be, for example, a coated tool in which all of the base body having a hexahedral shape in which the shapes of the upper surface and the lower surface are parallelograms is a cubic boron nitride sintered compact, and a coating film is formed on the base body.

In the embodiment described above, the shape of the upper surface and the lower surface of the coated tool 1 is a parallelogram, but the shape of the upper surface and the lower surface of the coated tool 1 may be diamond or square. Additionally, the shape of the upper surface and the lower surface of the coated tool 1 may be triangular, pentagonal, hexagonal, etc.

The shape of the coated tool 1 may be of a positive type or negative type. The positive type is a type in which the side surface is inclined with respect to the central axis passing through the center of the upper surface and the center of the lower surface of the coated tool 1, and the negative type is a type in which the side surface is parallel to the central axis.

In the embodiment described above, an example is described in which the base body 10 contains cubic boron nitride (cBN) particles. Although not limited thereto, the base body disclosed in the present application may contain particles such as hexagonal boron nitride (hBN), rhombohedral boron nitride (rBN), wurtzite boron nitride (wBN), etc.

In the embodiment described above, the coated tool 1 has been described as being used for cutting processing, but the coated tool according to the present application can also be applied to a tool other than a cutting tool, such as a tool or a cutting edge for excavation.

Further effects and variations can be readily derived by those skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

The invention claimed is:

1. A coated tool, comprising:
a base body containing a plurality of boron nitride particles; and
a coating film on the base body, wherein
in a case where a hardness is measured by pressing an indenter from a surface of the coating film to a depth of 20% of the coating film while changing an indentation load of the indenter, a maximum hardness difference, which is a difference between a maximum hardness and a minimum hardness of the hardness, is 4 GPa or more,
the coating film comprises:
a hard layer; and
a metal layer between the base body and the hard layer,
the hard layer comprises:
a laminate portion on the metal layer and comprising a plurality of first metal nitride layers and a plurality of second metal nitride layers, the plurality of first metal nitride layers and the plurality of second metal nitride layers being alternately layered; and
a third metal nitride layer on the laminate portion,
the metal layer contains Al and Cr,
each first metal nitride layer among the plurality of first metal nitride layers contains AlTiN,
each second metal nitride layer among the plurality of second metal nitride layers contains AlCrN,
the third metal nitride layer contains AlTIN,
a thickness of the metal layer is less than a thickness of the laminate portion, and
a thickness of the third metal nitride layer is greater than the thickness of the laminate portion.

2. The coated tool according to claim 1, wherein the metal layer contains Al and Cr in a combined amount of 95 atomic % or more.

3. The coated tool according to claim 1, wherein the base body comprises a binder phase between the boron nitride particles.

4. The coated tool according to claim 1, wherein the maximum hardness difference is 8 GPa or more.

5. The coated tool according to claim 1, wherein when a depth at the maximum hardness is a maximum hardness depth, and a depth at the minimum hardness is a minimum hardness depth, the maximum hardness depth is smaller than the minimum hardness depth.

6. The coated tool according to claim 5, wherein a difference between the maximum hardness depth and the minimum hardness depth is from 180 nm to 500 nm.

7. The coated tool according to claim 5, wherein the maximum hardness depth is from 80 nm to 200 nm.

8. The coated tool according to claim 5, wherein the minimum hardness depth is 300 nm or more.

9. The coated tool according to claim 1, wherein the hardness has an average hardness, and a difference between the average hardness and the minimum hardness is 2.0 GPa or more.

10. The coated tool according to claim 1, wherein the maximum hardness is 25 GPa or more.

11. The coated tool according to claim 1, further comprising:
a support body made of a cemented carbide alloy or a cermet, wherein
the base body is on the support body.

12. A cutting tool, comprising:
a rod-shaped holder comprising a pocket at an end thereof; and
a coated tool in the pocket, the coated tool comprising:
a base body containing a plurality of boron nitride particles; and
a coating film on the base body, wherein
in a case where a hardness is measured by pressing an indenter from a surface of the coating film to a depth of 20% of the coating film while changing an indentation load of the indenter, a maximum hardness difference, which is a difference between a maximum hardness and a minimum hardness of the hardness, is 4 GPa or more,
the coating film comprises:
a hard layer; and
a metal layer between the base body and the hard layer,
the hard layer comprises:
a laminate portion on the metal layer and comprising a plurality of first metal nitride layers and a plurality of second metal nitride layers, the plurality of first metal nitride layers and the plurality of second metal nitride layers being alternately layered; and
a third metal nitride layer on the laminate portion,
the metal layer contains Al and Cr,
each first metal nitride layer among the plurality of first metal nitride layers contains AlTiN,
each second metal nitride layer among the plurality of second metal nitride layers contains AlCrN,
the third metal nitride layer contains AlTIN, a thickness of the metal layer is less than a thickness of the laminate portion, and a thickness of the third metal nitride layer is greater than the thickness of the laminate portion.

* * * * *